United States Patent
Han et al.

(10) Patent No.: US 10,439,222 B2
(45) Date of Patent: Oct. 8, 2019

(54) POSITIVE ELECTRODE COMPOSITION FOR RECHARGEABLE LITHIUM BATTERY, AND POSITIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Seung-Hun Han, Yongin-si (KR); Myung-Duk Lim, Yongin-si (KR); Chae-Woong Cho, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 781 days.

(21) Appl. No.: 14/965,818

(22) Filed: Dec. 10, 2015

(65) Prior Publication Data

US 2016/0172679 A1    Jun. 16, 2016

(30) Foreign Application Priority Data

Dec. 12, 2014 (KR) .................. 10-2014-0179262

(51) Int. Cl.
*H01M 4/62*       (2006.01)
*H01M 10/052*     (2010.01)
*H01M 4/505*      (2010.01)
*H01M 4/525*      (2010.01)
*H01M 4/02*       (2006.01)

(52) U.S. Cl.
CPC ........... *H01M 4/622* (2013.01); *H01M 4/505* (2013.01); *H01M 4/525* (2013.01); *H01M 10/052* (2013.01); *H01M 2004/028* (2013.01)

(58) Field of Classification Search
CPC ...... H01M 4/622; H01M 4/525; H01M 4/505; H01M 10/052; H01M 2004/028
See application file for complete search history.

(56) References Cited

U.S. PATENT DOCUMENTS

| | | |
|---|---|---|
| 8,927,150 B2 | 1/2015 | Choi et al. |
| 2003/0027046 A1 | 2/2003 | Hosokawa et al. |
| 2011/0020703 A1 | 1/2011 | Suzuki et al. |
| 2011/0256442 A1 | 10/2011 | Kageira et al. |
| 2012/0052381 A1 | 3/2012 | Ogata et al. |
| 2012/0315530 A1 | 12/2012 | Kageura |
| 2015/0086860 A1* | 3/2015 | Yokoi ................... H01M 4/622 429/188 |

FOREIGN PATENT DOCUMENTS

| | | |
|---|---|---|
| JP | 11-204108 A | 7/1999 |
| JP | 2000-182606 A | 6/2000 |
| JP | 2001-143711 A | 5/2001 |
| JP | 2001-176516 A | 6/2001 |
| JP | 2002-042817 A | 2/2002 |
| JP | 2006-172992 A | 6/2006 |
| JP | 2007-280657 A | 10/2007 |
| JP | 2007-280832 A | 10/2007 |
| JP | 2008-108650 A | 5/2008 |
| JP | 2008-153053 A | 7/2008 |
| JP | 2008-226515 A | 9/2008 |
| JP | 2009-081072 A | 4/2009 |
| JP | 2009-224188 A | 10/2009 |
| JP | 2009-245827 A | 10/2009 |
| JP | 2010-170993 A | 8/2010 |
| JP | 2010-238365 | * 10/2010 |
| JP | 2011-008965 A | 1/2011 |
| JP | 2011-044320 A | 3/2011 |
| JP | 2011-192644 A | 9/2011 |
| JP | 2011-238415 A | 11/2011 |
| JP | 2011-238461 A | 11/2011 |
| JP | 2012-089411 A | 5/2012 |
| JP | 2012-190773 A | 10/2012 |
| KR | 10-2011-0066592 A | 6/2011 |
| WO | WO 2014/132935 | * 9/2014 |

* cited by examiner

*Primary Examiner* — Laura Weiner
(74) *Attorney, Agent, or Firm* — Knobbe, Martens, Olson & Bear, LLP

(57) ABSTRACT

A positive electrode composition for a rechargeable lithium battery includes a positive active material, a binder, and an aqueous solvent, wherein the binder includes carboxylmethyl cellulose having an average polymerization degree of about 700 to about 1200, and a positive electrode for a rechargeable lithium battery and a rechargeable lithium battery including the same are provided.

10 Claims, 2 Drawing Sheets

POSITIVE ELECTRODE COMPOSITION FOR RECHARGEABLE LITHIUM BATTERY, AND POSITIVE ELECTRODE FOR RECHARGEABLE LITHIUM BATTERY AND RECHARGEABLE LITHIUM BATTERY INCLUDING SAME

RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2014-0179262 filed in the Korean Intellectual Property Office on Dec. 12, 2014, the disclosure of which is incorporated in the entirety by reference.

BACKGROUND

Field

This disclosure relates to a positive electrode composition for a rechargeable lithium battery, and a positive electrode for a rechargeable lithium battery and a rechargeable lithium battery including the same.

Description of the Related Technology

A rechargeable lithium battery includes positive and negative electrodes including a material that can reversibly intercalate/deintercalate lithium ions as positive and negative active materials and an organic electrolyte solution or a polymer electrolyte solution filled between the positive and negative electrodes. Herein, the positive and negative electrodes intercalate and deintercalate lithium ions and produce electrical energy through oxidation and reduction reactions.

As for a positive active material of a rechargeable lithium battery, a lithium-transition metal oxide having a structure being capable of intercalating lithium ions such as $LiCoO_2$, $LiMn_2O_4$, $LiNi_{1-x}Co_xO_2$ (0<x<1) and the like are mainly used.

As for an electrode binder used in a rechargeable lithium battery, a non-aqueous system is generally used, but a binder obtained by dissolving polyvinylidene fluoride (PVDF) in an N-methyl-2-pyrrolidone (NMP) or acetone as the organic solvent is particularly used.

However, when the non-aqueous system is used as a binder, the organic solvent such as NMP, acetone and the like may contaminate the environment and is also relatively expensive and thus, may increase the unit manufacturing cost of a lithium battery. In addition, since the PVDF has relatively weak adherence, the binder may be required in a large amount to apply a sufficient binding force between a current collector and an active material.

However, when the binder is used in a large amount, the amount of the active material is reduced accordingly, thus failing to achieve large capacity of a battery. In addition, fluorine of the PVDF reacts with lithium ions and forms LiF, which may cause thermal runaway and thus, decrease safety of the lithium ion battery. In particular, as the lithium ion battery is manufactured to have higher capacity, so does the thermal runaway of LiF and thus, makes it difficult to obtain a safe battery.

In order to solve the problem, an attempt to use an aqueous binder system obtained by dispersing a binder into water has recently been made during manufacture of an electrode. The aqueous binder as an emulsion may be dispersed into water without needing an organic solvent and also, has strong adherence and thus, may be required in a smaller amount and proportionately increasing the amount of an active material, thus achieving a high-capacity lithium battery.

However, the aqueous binder system requires improvement in terms of processibility of appropriately maintaining fluidity and viscosity of an electrode composition and the like, formation of a stable layer without brittleness when the electrode composition is dried, and the like.

SUMMARY

One embodiment provides a positive electrode composition for a rechargeable lithium battery having high capacity, high charge and discharge efficiency, and excellent cycle-life characteristics by applying stable and flexible electrode characteristics even if it is a thick film electrode.

Another embodiment provides a positive electrode for a rechargeable lithium battery including the positive electrode composition.

Yet another embodiment provides a rechargeable lithium battery including the positive electrode.

One embodiment provides a positive electrode composition for a rechargeable lithium battery that includes a positive active material, a binder, and an aqueous solvent, wherein the binder includes carboxylmethyl cellulose having an average polymerization degree of about 700 to about 1200.

The carboxylmethyl cellulose may have an average polymerization degree of about 800 to about 1200.

The carboxylmethyl cellulose may include a compound including a repeating unit represented by the following Chemical Formula 1.

[Chemical Formula 1]

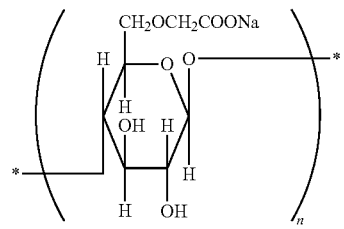

In the Chemical Formula 1, n is an integer ranging from 500 to 1200.

The carboxylmethyl cellulose may have a degree of substitution (DS) of about 0.5 to about 1.5.

The carboxylmethyl cellulose may be included in an amount of about 0.5 wt % to about 1.5 wt % based on the sum of the positive active material and the binder.

The binder may further include an acryl-based resin.

The acryl-based resin may include polyethylacrylate, polyethylmethacrylate, polypropylacrylate, polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmetacrylate, a combination thereof, or a copolymer thereof. Furthermore, the acryl-based resin may be used as an emulsion type.

The carboxylmethyl cellulose may be included in an amount of about 1.5 wt % to about 5 wt % based on the total amount of the binder.

The positive active material may include lithium nickel-based oxide, lithium cobalt-based oxide, lithium manganese-based oxide, lithium titanium-based oxide, lithium nickel manganese-based oxide, lithium nickel cobalt manganese-based oxide, lithium nickel cobalt aluminum-based oxide, a lithium iron phosphate-based compound, or a combination thereof.

Another embodiment provides a positive electrode for a rechargeable lithium battery including the positive electrode composition.

The positive electrode may have a loading level on its both sides of about 45 mg/cm² to about 65 mg/cm².

Another embodiment provides a rechargeable lithium battery including the positive electrode; a negative electrode; and an electrolyte.

Other embodiments are included in the following detailed description.

A rechargeable lithium battery having high-capacity, high charge and discharge efficiency, and excellent cycle-life characteristics may be obtained by providing an aqueous positive electrode composition applying stable and flexible electrode characteristics even if it is a thick film electrode.

DETAILED DESCRIPTION

Figure 1:
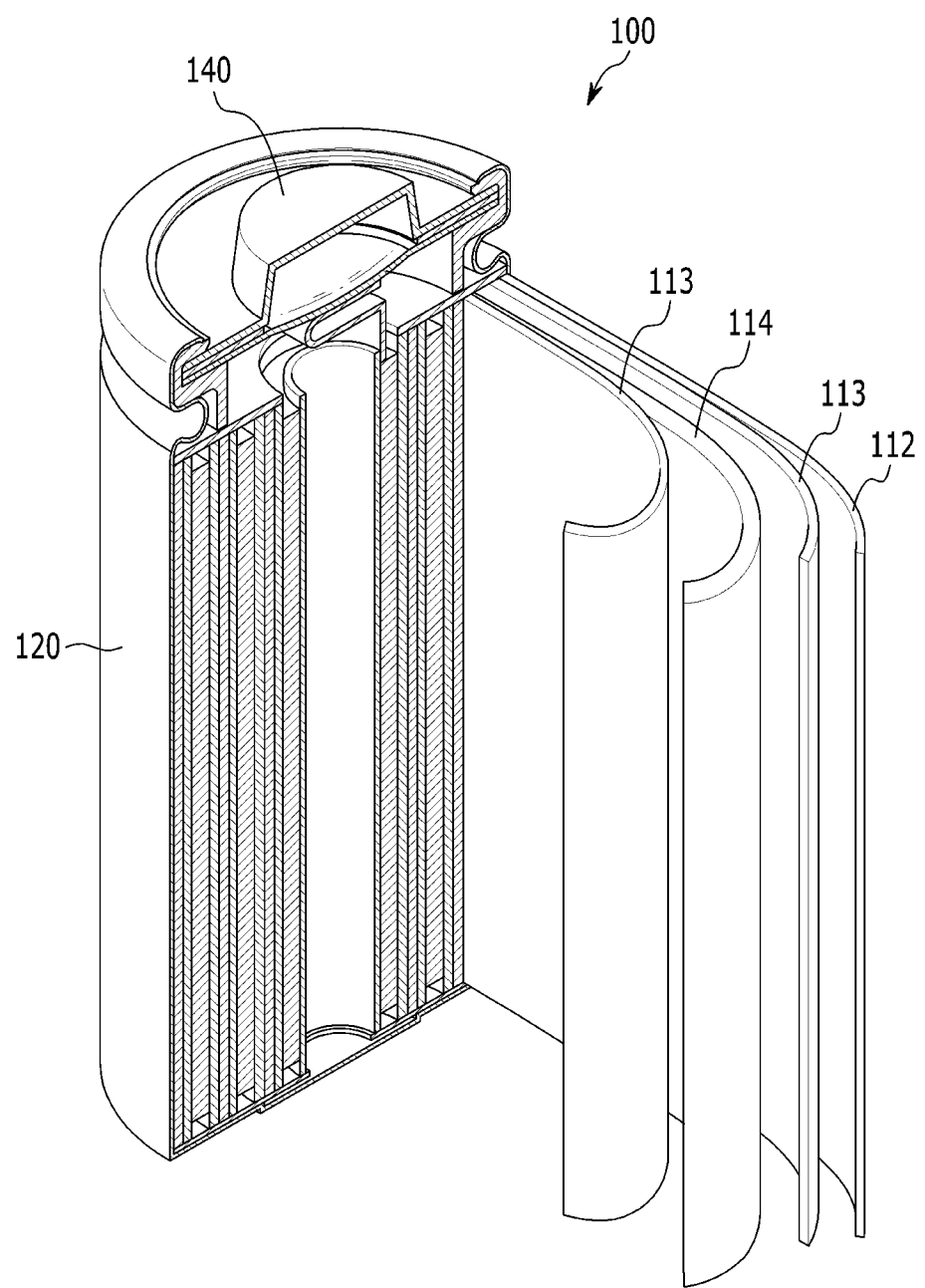
FIG. 1 is a schematic view showing a structure of a rechargeable lithium battery according to one embodiment.

Hereinafter, embodiments are described in detail. However, these embodiments are only exemplary, and this disclosure is not limited thereto.

Hereinafter, a positive electrode composition for a rechargeable lithium battery according to one embodiment is described.

The positive electrode composition may include positive active material, binder and aqueous solvent.

The binder includes carboxylmethyl cellulose having an average polymerization degree of about 700 to about 1200. When a positive electrode composition including carboxylmethyl cellulose having an average polymerization degree within the aforementioned range is used, a stable and flexible electrode may be formed even if it is a thick film electrode, and thus, a rechargeable lithium battery having high capacity and excellent cycle-life characteristics may be obtained.

The carboxylmethyl cellulose may also play a role of being a thickener. In other words, the carboxylmethyl cellulose may add viscosity to the positive electrode composition.

In general, when a positive electrode composition is coated on a current collector and dried, carboxylmethyl cellulose may make the positive electrode composition brittle. Furthermore, when the composition is coated thicker to obtain a high-capacity battery, the positive electrode composition may become more brittle, and thus, a stable layer is more difficult to form. Thus, when the carboxylmethyl cellulose is used in less than or equal to a predetermined amount to reduce the brittleness, the positive electrode composition may sink down due to its deteriorated liquidity and viscosity and have deteriorated dispersion.

However, a positive electrode composition according to one embodiment has excellent dispersion and may form a stable layer, which will not be brittle after the drying by applying carboxylmethyl cellulose having a polymerization degree within a predetermined range. In addition, the positive electrode composition may be loaded in a higher level on an electrode to obtain a thick film electrode and thus, obtain a stable high-capacity battery.

The carboxylmethyl cellulose may have an average polymerization degree of about 700 to about 1200, and specifically about 800 to about 1200. When the carboxylmethyl cellulose satisfies the polymerization degree range, a stable layer may be formed, and the loading level of the positive electrode composition on an electrode plate may be increased. In other words, a stable and flexible positive electrode may be formed even though the loading level of the positive electrode composition on an electrode is increased.

The average polymerization degree may be calculated by measuring a weight average molecular weight (Mw) with a gel permeation chromatography (GPC) measuring device, and using the weight average molecular weight (Mw).

Specifically, the carboxylmethyl cellulose may include a compound including a repeating unit represented by the following Chemical Formula 1.

[CHEMICAL FORMULA 1]

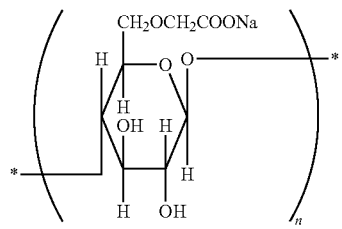

In the Chemical Formula 1, n represents the number of the repeating unit and corresponds to the polymerization degree. Specifically, n may be an integer of ranging from 500 to 1200, for example, 800 to 1200.

The carboxylmethyl cellulose may have a degree of substitution (DS) of about 0.5 to about 1.5. The degree of substitution indicates a degree that a carboxylmethyl group is substituted for a hydroxy group in a glucose repeating unit. Specifically, when the carboxylmethyl group is substituted for one of three hydroxy group in the glucose repeating unit, the degree of substitution is 1, when carboxylmethyl groups are substituted for all the three hydroxy groups, a degree of substitution is 3, when the three hydroxy groups are not substituted, the degree of substitution is 0. When the carboxylmethyl cellulose has a degree of substitution within the range, the composition may dissolve well in water and form a stable layer.

The carboxylmethyl cellulose may be included in an amount of about 0.5 wt % to about 1.5wt % based on the sum of the positive active material and the binder. Specifically, it may be included in an amount of about 0.6 wt % to about 1.2 wt %. Herein, the positive electrode composition may form a stable layer.

On the other hand, the binder may further include an acryl-based resin. Herein, the acrylic-based resin may play a role of binding, and the carboxylmethyl cellulose may play a role of thickening and binding to a certain degree.

The acryl-based resin is an aqueous binder and thus, has a very small side reaction due to decomposition of a binder during charge of a positive electrode as well as an excellent binding force.

The acryl-based resin may be selected from, for example polyethylacrylate, polyethylmethacrylate, polypropylacrylate, polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmetacrylate, a combination thereof, or a copolymer thereof. Furthermore, the acryl-based resin may be used as an emulsion type.

The carboxylmethyl cellulose may be included in an amount of about 20 wt % to about 30 wt % based on the total amount of the binder. Herein, the positive electrode composition may have an excellent binding force and form a stable layer.

The positive active material may include a compound that reversibly intercalates and deintercalates lithium (a lithiated intercalation compound). Specifically, the positive active material may be a composite oxide of lithium and metal of cobalt, manganese, nickel, or a combination thereof, in other words, one of lithium metal oxides. For example the positive active material may be lithium nickel-based oxide, lithium cobalt-based oxide, lithium manganese-based oxide, lithium titanium-based oxide, lithium nickel manganese-based oxide, lithium nickel cobalt manganese-based oxide, lithium nickel cobalt aluminum-based oxide, a lithium iron phosphate-based oxide, or a combination thereof.

The positive active material may be specifically a compound represented by one of the following chemical formulae:

$Li_aA_{1-b}R_bD'_2$ (0.90≤a≤1.8 and 0≤b≤0.5); $Li_aE_{1-b}R_bO_{2-c}D'_c$ (0.90≤a≤1.8, 0≤b≤0.5 and 0≤c≤0.05); $LiE_{2-b}R_bO_{4-c}D'_c$ (0≤b≤0.5, 0≤c≤0.05); $Li_aNi_{1-b-c}Co_bR_cD'_\alpha$ (0.90≤a≤1.8, 0≤b≤0.5, 0≤c≤0.05 and 0<α<2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD'_\alpha$ (0.90≤a≤1.8, 0≤b≤0.5, 0≤c≤0.05 and 0<α<2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0 <α<2); $Li_aNi_bE_cG_dO_2$ (0.90≤a≤1.8, 0≤b≤0.9, 0≤c≤0.5 and 0.001≤d≤0.1); $Li_aNi_bCo_cMn_dGeO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.01≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiT'O_2$; $LiNiVO_4$; $Li_{(3-f)}J_2(PO_4)_3$(0≤f≤2); $Li_{(3-f)}Fe_2(PO_4)_3$(0≤f≤2); and $LiFePO_4$.

In the chemical formulae, A is Ni, Co, Mn, or a combination thereof; R is Al, Ni, Co, Mn, Cr, Fe, Mg, Sr, V, a rare earth element, or a combination thereof; D' is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T' is Cr, V, Fe, Sc, Y, or a combination thereof; and J is V, Cr, Mn, Co, Ni, Cu or a combination thereof.

The compounds may have a coating layer on the surface, or may be mixed with another compound having a coating layer. The coating layer may include a coating element compound such as an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

The positive electrode composition may include an aqueous solvent. The aqueous solvent may be water, alcohol, or a combination thereof. The positive electrode composition is an aqueous positive electrode composition including an aqueous solvent and thus, needs neither a dry room during the manufacture process nor a recycling process and thus, may be environmentally-friendly and decrease facilities for mass production. In addition, the aqueous positive electrode composition may be applied to various materials for an active material having a large specific surface area and has low reactivity with an electrolyte and thus, is advantageous in terms of stability.

The positive electrode composition may further include a conductive material.

The conductive material improves electrical conductivity of an electrode. Any electrically conductive material may be used as a conductive material, unless it causes a chemical change.

The conductive material may be, for example natural graphite, artificial graphite, carbon black, acetylene black, ketjen black, a carbon fiber, a metal powder or a metal fiber of copper, nickel, aluminum, silver, and the like, a conductive material such as a polyphenylene derivative and the like.

Hereinafter, a positive electrode for a rechargeable lithium battery according to another embodiment is described.

The positive electrode may be manufactured by coating the above positive electrode composition on a current collector.

Specifically, the positive electrode includes a current collector and a positive active material layer formed on the current collector.

The positive active material layer is formed by coating the above positive electrode composition on a current collector, and includes a positive active material, a binder and optionally a conductive material.

The positive active material, binder and conductive material of the positive active material layer are the same as described above, and thus their descriptions are omitted.

The current collector may be Al, but is not limited thereto.

The positive electrode has a relatively high loading level and may maintain a stable and flexible electrode. The loading level indicates total amounts of the positive active material, the binder and the conductive active material to area of the positive active material layer (total amounts of the positive active material, the binder and the conductive active material/area of the positive active material layer) and it is well known in the related art Specifically, the positive electrode may have a loading level on its both sides of about 45 mg/cm² to about 65 mg/cm², and more specifically about 50 mg/cm² to about 60 mg/cm². In other words, when the positive electrode is manufactured into a thick film within the loading level range, a stable and flexible electrode may be secured, achieving a rechargeable lithium battery having high-capacity and excellent cycle-life characteristics.

Hereinafter, a rechargeable lithium battery according to another embodiment is described with reference with FIG. 1.

FIG. 1 is a schematic view showing a rechargeable lithium battery according to one embodiment.

Referring to FIG. 1, the rechargeable lithium battery 100 is a cylindrical battery that includes a negative electrode 112, a positive electrode 114, a separator 113 interposed between the negative electrode 112 and the positive electrode 114, an electrolyte (not shown) impregnating the negative electrode 112, positive electrode 114, and separator 113, a battery case 120, and a sealing member 140 sealing the battery case 120. The rechargeable lithium battery 100 is manufactured by sequentially laminating a negative electrode 112, a positive electrode 114, and a separator 113, spirally winding them, and housing the spiral-wound product in a battery case 120.

The positive electrode is the same as described above.

The negative electrode 112 includes a current collector and a negative active material layer formed on the current collector.

The current collector may be a copper foil, a nickel foil, a stainless steel foil, a titanium foil, a nickel foam, a copper foam, a polymer substrate coated with a conductive metal, or a combination thereof.

The negative active material layer includes a negative active material, a binder and optionally a conductive material.

The negative active material may include a material that reversibly intercalates/deintercalates lithium ions, a lithium metal, lithium metal alloy, material being capable of doping and dedoping lithium, or a transition metal oxide.

The material that reversibly intercalates/deintercalates lithium ions may be a carbon material, and may be any generally-used carbon-based negative active material in a rechargeable lithium ion rechargeable battery. Examples thereof may be crystalline carbon, amorphous carbon, or a combination thereof. The crystalline carbon may be non-shaped, or may be sheet, flake, spherical, or fiber shaped natural graphite or artificial graphite. The amorphous carbon may be a soft carbon, a hard carbon, mesophase pitch carbonized products, fired coke, and the like.

The lithium metal alloy may be an alloy of lithium and a metal of Na, K, Rb, Cs, Fr, Be, Mg, Ca, Sr, Si, Sb, Pb, In, Zn, Ba, Ra, Ge, Al or Sn.

The material being capable of doping and dedoping lithium may include Si, $SiO_x$ (0<x<2), a Si-C composite, a Si-Q alloy (wherein Q' is an alkali metal, an alkaline-earth metal, Group 13 to 16 elements, a transition metal, a rare earth element, or a combination thereof, and not Si), Sn, $SnO_2$, a Sn-C composite, Sn-R (wherein R' is an alkali metal, an alkaline-earth metal, Group 13 to 16 elements, a transition metal, a rare earth element, or a combination thereof, and not Sn), and the like. Specific element of the Q' and R' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po or a combination thereof.

The transition metal oxide may be vanadium oxide, lithium vanadium oxide, and like.

The binder improves binding properties of negative active material particles with one another and with a current collector. Examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber and the like; a metal-based material such as a metal powder, a metal fiber, and the like of copper, nickel, aluminum, silver, and the like; a conductive polymer such as a polyphenylene derivative and the like; or a mixture thereof.

The current collector may be a copper foil, a nickel foil, a stainless steel foil, a titanium foil, a nickel foam, a copper foam, a polymer substrate coated with a conductive metal, or a combination thereof.

The negative electrode and the positive electrode may be manufactured by a method including mixing each active material, conductive material and binder in a solvent to prepare an active material composition, and coating the active material composition on the current collector. According to the kind of the binder, the solvent may be water. The electrode manufacturing method is well known, and thus is not described in detail in the present specification.

The electrolyte includes a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), butylene carbonate (BC), and the like.

Particularly, when a linear carbonate compound and a cyclic carbonate compound are mixed, a solvent having a high dielectric constant and a low viscosity may be provided. Herein, the cyclic carbonate compound and linear carbonate compound may be mixed together in a volume ratio ranging from about 1:1 to about 1:9.

The ester-based solvent may include, for example methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may include, for example dibutylether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethyl alcohol, isopropyl alcohol, and the like. The aprotic solvent may include nitriles such as R-CN (where R is a C2 to C20 linear, branched, or cyclic hydrocarbon, a double bond, an aromatic ring, or an ether bond); amides such as dimethylformamide; dioxolanes such as 1,3-dioxolane; sulfolanes; and the like.

The non-aqueous organic solvent may be used singularly or in a mixture, and when the organic solvent is used in a mixture, the mixture ratio may be controlled in accordance with a desirable battery performance.

The electrolyte may further include an overcharge inhibitor additive such as ethylene-based carbonate, pyrocarbonate, or the like. Non-limiting examples of the ethylene-based carbonate may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like.

The lithium salt is dissolved in an organic solvent, supplies lithium ions in a battery, basically operates the rechargeable lithium battery, and improves lithium ion transportation between positive and negative electrodes therein.

Specific examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, LiN $LiN(C_xF_{2x+1}SO_2)(C_yF_{2y+1}SO_2)$, wherein, x and y are natural numbers, e.g., an integer of 1 to 20, LiCl, LiI, $LiB(C_2O_4)_2$ (lithium bis(oxalato) borate, LiBOB), or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator 113 may include any materials commonly used in the conventional lithium battery as long as separating a negative electrode from a positive electrode and providing a transporting passage of lithium ion. In other words, it may have a low resistance to ion transport and an excellent impregnation for electrolyte. For example, it may be selected from glass fiber, polyester, polyethylene, polypropylene, polytetrafluoroethylene (PTFE), or a combination thereof. It may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

Hereinafter, examples of the present disclosure and comparative examples are described. These examples, however, are not in any sense to be interpreted as limiting the scope of the disclosure.

Manufacture of Rechargeable Lithium Battery Cell

EXAMPLE 1

1000 g of $LiNi_{0.5}Co_{0.2}Mn_{0.3}O_2$, 13.4 g of acetylene black and 3.3 g of carboxylmethyl cellulose having an average polymerization degree of 1000 to 1200 were put in 75 g of water and primarily mixed therewith. Then, 70 g of water and 25 g of an acryl-based copolymerization emulsion (ax-4069, Zeon Co., Tokyo, Japan) were additionally thereto, and the mixture was secondarily mixed, preparing a positive electrode composition. The positive electrode composition was coated on an aluminum foil and dried to evaporate the water and then, compressed, manufacturing a positive electrode.

On the other hand, 97.5 g of graphite, 1 g of carboxylmethyl cellulose (CMC) and 50 g of water were primarily mixed, 1.5 g (40% of a solid) of a binder (BM400B, Tokyo, Japan) and 50 g of water were additionally added thereto to prepare slurry, and the slurry was coated on a copper layer and dried, manufacturing a negative electrode.

The positive and negative electrodes were used with a polyethylene/polypropylene separator and an electrolyte solution obtained by mixing ethylene carbonate (EC), diethyl carbonate (DEC) and dimethyl carbonate (DMC) in a volume ratio of 1:1:8 and dissolving 1.3 M $LiPF_6$ in the mixed solvent, manufacturing a rechargeable lithium battery cell.

COMPARATIVE EXAMPLE 1

A rechargeable lithium battery cell was manufactured according to the same method as Example 1 except for using carboxylmethyl cellulose having an average polymerization degree of 220 to 500 to manufacture the positive electrode.

COMPARATIVE EXAMPLE 2

A rechargeable lithium battery cell was manufactured according to the same method as Example 1 except for using carboxylmethyl cellulose having an average polymerization degree of 1300 to 1500 to manufacture the positive electrode.

COMPARATIVE EXAMPLE 3

A rechargeable lithium battery cell was manufactured according to the same method as Example 1 except for using carboxylmethyl cellulose having an average polymerization degree of 1800 to 2000 to manufacture the positive electrode.

The weight average molecular weight and the polymerization degree of the carboxylmethyl cellulose used in Example 1 and Comparative Examples 1 to 3 were provided in the following Table 1.

TABLE 1

|  | Average polymerization degree | Weight average molecular weight (g/mol) |
| --- | --- | --- |
| Example 1 | 1000 to 1200 | 170000 to 220000 |
| Comparative Example 1 | 220 to 500 | 47000 to 54000 |
| Comparative Example 2 | 1300 to 1500 | 210000 to 250000 |
| Comparative Example 3 | 1800 to 2000 | 320000 to 380000 |

Evaluation 1: Stiffness of Positive Electrode

The stiffness of each positive electrode of Example 1 and Comparative Examples 1 to 3 was measured, and the results are provided in the following Table 2. The stiffness of the positive electrode was measured by using a Taber V-5 stiffness meter (Model No. 150-E, TABER Industries, New York, USA).

A loading level in the following Table 2 was measured based on the both sides of the positive electrode.

TABLE 2

|  | Loading level (mg/cm$^2$) | Stiffness (gf/cm) |
| --- | --- | --- |
| Example 1 | 53.55 | 2.1 |
| Comparative Example 1 | — | X (electrode plate is not realized due to slurry precipitation) |
| Comparative Example 2 | 53.10 | 2.5 |
| Comparative Example 3 | 53.33 | 3.6 |

Referring to the Table 2, the positive electrode of Example 1 using carboxylmethyl cellulose having an average polymerization degree of about 700 to about 1200 as an aqueous binder showed excellent flexibility even when manufactured into a thick film by increasing a loading level compared with the positive electrodes of Comparative Examples 2 and 3 using carboxylmethyl cellulose having an average polymerization degree out of the range. Accordingly, a high-capacity rechargeable lithium battery cell may be obtained.

On the other hand, Comparative Examples 1 to 3 using carboxylmethyl cellulose having an average polymerization degree out of the range turned out not to result in an electrode at all or did not secure flexibility due to high stiffness when manufactured into a thick film.

Evaluation 3: Cycle-Life Characteristics

Figure 2:
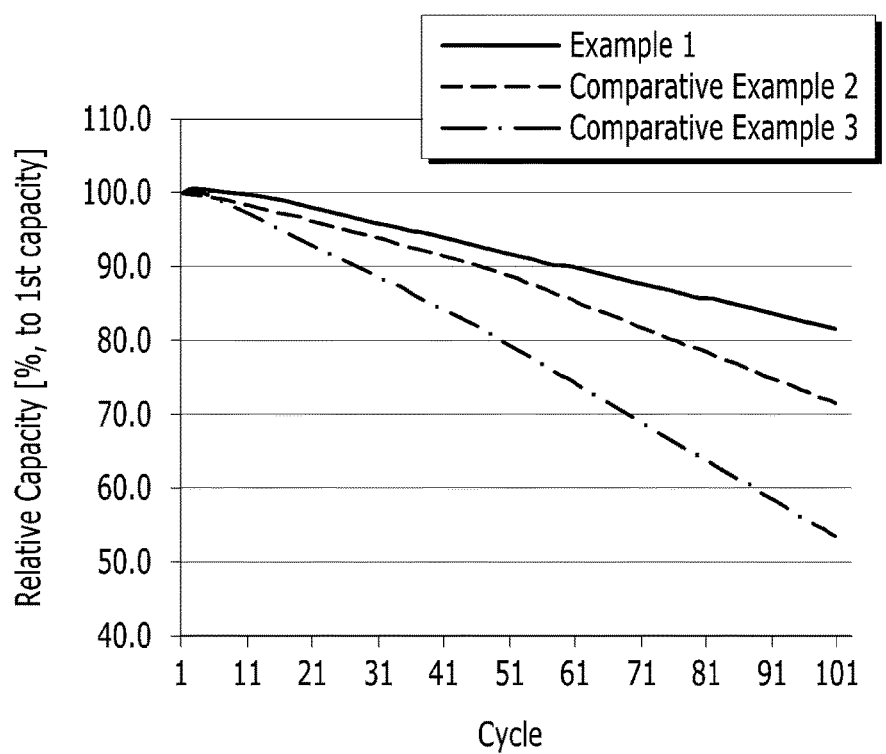
FIG. 2 is a graph showing cycle-life characteristics of the rechargeable lithium battery cells according to Example 1 and Comparative Examples 2 and 3.

The rechargeable lithium battery cells of Example 1 and Comparative Examples 2 and 3 were charged and discharged under the following condition and their cycle-life characteristics were evaluated, and the results are provided in FIG. 2.

The rechargeable lithium battery cells were subjected to 100 times constant current-charge at a 0.2 C-rate within a voltage range ranging from 3.0 V to 4.3 V relative to a lithium metal at 25° C. and constant current-discharged at a 1.0 C-rate.

FIG. 2 is a graph showing cycle-life characteristics of the rechargeable lithium battery cells according to Example 1 and Comparative Examples 2 and 3.

Referring to FIG. 2, Example 1 using carboxylmethyl cellulose having an average polymerization degree of about 700 to about 1200 as an aqueous binder for a positive electrode showed excellent cycle-life characteristics compared with Comparative Examples 2 and 3 using carboxylmethyl cellulose having an average polymerization degree out of the range.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A positive electrode for a rechargeable lithium battery comprising a positive electrode composition, the said composition comprising:
a positive active material, a binder, a conductive material, and,
wherein the binder includes carboxylmethyl cellulose having an average polymerization degree of about 1000 to about 1200; wherein the positive electrode has a loading level on its both sides of about 45 mg/cm² to about 65 mg/cm², and
wherein the positive active material comprises lithium nickel-based oxide, lithium cobalt-based oxide, lithium manganese-based oxide, lithium titanium-based oxide, lithium nickel manganese-based oxide, lithium nickel cobalt manganese-based oxide, lithium nickel cobalt aluminum-based oxide, a lithium iron phosphate-based compound, or a combination thereof.

2. The positive electrode composition for a rechargeable lithium battery of claim 1, wherein the carboxylmethyl cellulose comprises a compound including a repeating unit represented by the following Chemical Formula 1:

[Chemical Formula 1]

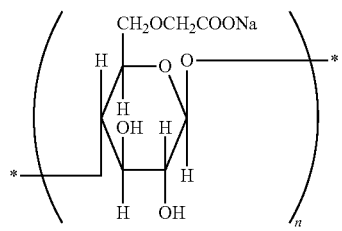

wherein, n is an integer ranging from 500 to 1200.

3. The positive electrode composition for a rechargeable lithium battery of claim 1, wherein the carboxylmethyl cellulose has a degree of substitution (DS) of about 0.5 to about 1.5.

4. The positive electrode composition for a rechargeable lithium battery of claim 1, wherein the carboxylmethyl cellulose is included in an amount of about 0.5 wt % to about 1.5 wt % based on the sum of amounts of the positive active material and the binder.

5. The positive electrode composition for a rechargeable lithium battery of claim 1, wherein the carboxylmethyl cellulose is included in an amount of about 0.6 wt % to about 1.2 wt % based on the sum of amounts of the positive active material and the binder.

6. The positive electrode composition for a rechargeable lithium battery of claim 1, wherein the binder further comprises an acryl-based resin.

7. The positive electrode composition for a rechargeable lithium battery of claim 6, wherein the acryl-based resin comprises polyethylacrylate, polyethylmethacrylate, polypropylacrylate, polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, a combination thereof, or a copolymer thereof.

8. The positive electrode composition for a rechargeable lithium battery of claim 1, wherein the carboxylmethyl cellulose is included in an amount of about 20 wt % to about 30 wt % based on the total amount of the binder.

9. The positive electrode for a rechargeable lithium battery of claim 1, wherein the positive electrode has a loading level on its both sides of about 50 mg/cm² to about 60 mg/cm².

10. A rechargeable lithium battery comprising
the positive electrode of claim 1;
a negative electrode; and
an electrolyte.

* * * * *